United States Patent
Enomoto

(10) Patent No.: US 9,630,516 B2
(45) Date of Patent: Apr. 25, 2017

(54) WIRELESS CHARGING

(71) Applicant: Honda Motor Co., Ltd., Minato-ku, Tokyo (JP)

(72) Inventor: Tomoyuki Enomoto, Palos Verdes Estates, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 342 days.

(21) Appl. No.: 14/463,834

(22) Filed: Aug. 20, 2014

(65) Prior Publication Data
US 2016/0052404 A1    Feb. 25, 2016

(51) Int. Cl.
*H02J 7/00* (2006.01)
*B60L 11/18* (2006.01)

(52) U.S. Cl.
CPC ......... *B60L 11/182* (2013.01); *B60L 2230/00* (2013.01); *Y02T 10/7005* (2013.01); *Y02T 10/7088* (2013.01); *Y02T 90/122* (2013.01); *Y02T 90/14* (2013.01)

(58) Field of Classification Search
USPC ................................................. 320/104, 108
See application file for complete search history.

(56) References Cited

U.S. PATENT DOCUMENTS

| 5,821,731 A | 10/1998 | Kuki et al. | |
|---|---|---|---|
| 6,087,806 A | 7/2000 | Fujioka | |
| 2011/0082623 A1* | 4/2011 | Lu | B60W 10/06 701/41 |
| 2012/0005125 A1* | 1/2012 | Jammer | B60L 11/1848 705/412 |
| 2012/0193993 A1* | 8/2012 | Azancot | H02J 5/005 307/104 |
| 2012/0303397 A1* | 11/2012 | Prosser | H02J 7/0054 705/7.12 |
| 2013/0020993 A1 | 1/2013 | Taddeo et al. | |
| 2013/0181667 A1 | 7/2013 | Takeshita et al. | |
| 2014/0111155 A1 | 4/2014 | Bendicks | |
| 2015/0298560 A1* | 10/2015 | Keeling | B60L 5/005 191/10 |

FOREIGN PATENT DOCUMENTS

| DE | 2013004600 A2 | 1/2013 |
|---|---|---|
| DE | 2013045007 A1 | 4/2013 |
| EP | 2012049001 A3 | 6/2013 |
| FR | 2013072306 A1 | 5/2013 |
| JP | 2013077450 A1 | 5/2013 |

* cited by examiner

Primary Examiner — Brian Ngo
(74) Attorney, Agent, or Firm — Arent Fox LLP

(57) ABSTRACT

One or more embodiments of techniques or systems for vehicle-to-vehicle wireless charging are provided herein. A first vehicle may be equipped with a first vehicle-to-vehicle wireless charging system and a second vehicle may be equipped with a second vehicle-to-vehicle wireless charging system. The first vehicle may be placed in a charge providing mode and the second vehicle may be placed in a charge receiving mode. Respective vehicles may detect or monitor for hazards prior to, during, or after wireless charging. When hazards are detected, notifications may be provided to promote safety while wireless charging occurs. The first vehicle may be pulled alongside, in front of, or behind the second vehicle within a charging proximity to facilitate wireless charging. Control may be provided such that charging or starting the second vehicle is possible without exiting the first vehicle.

20 Claims, 8 Drawing Sheets

WIRELESS CHARGING

BACKGROUND

Generally, wired charging between vehicles requires hardware, such as jumper cables. For example, jumper cables may be electric cables which electrically connect power sources, such as batteries, of two vehicles. Jumper cables, booster cables, or jump leads have a pair of insulated wires with alligator clips which enable the ends of the jumper cable to be attached to a disabled vehicle or a corresponding power source, such as a battery of another vehicle. However, jump starting a vehicle or forming such physical connections may be dangerous because flammable hydrogen gas may be produced as a result. Further, users or operators may be injured if correct jump start procedures are not followed, such as if a recommended sequence of connections is not followed.

As an example, if connections are not properly made, a short circuit may be created, thereby igniting the battery or hydrogen gas associated with the battery. Additionally, jumper cables generally cannot be utilized to interconnect systems with different operating voltages or different system voltages. For example, if a jumper cable is used to connect a 6V system with a 12V system, damage to one or both systems may result. In any event, there may be risks associated with wired charging or utilizing jumper cables to provide electrical power from one vehicle to another or from a power source (e.g., backup battery) to a vehicle in need of power. Additionally, with regard to hybrid vehicles or electric vehicles, wired charging for these vehicles may occur at charging stations, which may be difficult to find and are not portable.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, a vehicle-to-vehicle wireless charging system is provided. A first vehicle equipped with a first vehicle-to-vehicle wireless charging system may charge, jump start, or supply electrical power or energy for a second vehicle equipped with a second vehicle-to-vehicle wireless charging system, such as when the second vehicle is stalled, disabled, or in need of electrical power (e.g., and the first vehicle has electrical power). As an example, if the second vehicle is disabled, in need of a jump start, or otherwise in need of electrical power, the first vehicle may be parked or stationed within a charging proximity of the second vehicle. The first vehicle may be oriented such that a primary charge component of the first vehicle is within a charging proximity of a secondary charge component of the second vehicle.

The first vehicle, the second vehicle, or both the first vehicle and the second vehicle may monitor a surrounding environment (e.g., traffic, roadways, etc.) or a real world environment for hazards, such as oncoming traffic, passing traffic, etc. Respective vehicles may provide, generate, or render one or more notifications based on one or more detected hazards within the real world environment, thereby alerting users or individuals of potentially dangerous scenarios, when charging should be conducted, or when charging should be avoided. The second vehicle (e.g., the vehicle with no charge) may communicate one or more vehicle specifications to the first vehicle to facilitate wireless charging. For example, one or more of the vehicle specifications may include operating voltages, current ranges, open circuit voltages, ampere-hours, cranking amperes, reserve capacity of a battery, etc. This enables the vehicle-to-vehicle wireless charging system of the first vehicle to provide power or charging to the second vehicle accordingly. In other words, the first vehicle may step up or step down voltage levels according to system voltage levels (e.g. 24 V or 12V) for the second vehicle, for example.

In one or more embodiments, vehicle-to-vehicle wireless charging may be achieved through electromagnetic induction. The first vehicle may include a primary charge component and the second vehicle may include a secondary charge component. Together when these two components are in close enough proximity or within a charging proximity of each other, respective charge components may form an electrical transformer. In other words, the primary charge component of the first vehicle may include one or more induction coils. Similarly, the secondary charge component of the second vehicle may also include one or more induction coils. When current, such as a charging current, is passed through the primary charge component, a time varying magnetic field is generated. Accordingly, when the secondary charge component is placed within a charging proximity of the primary charge component, exposure to this time varying magnetic field induces a current in the secondary charge component, thereby providing electrical power to the second vehicle. Connecting the secondary charge component to a battery thereby enables the battery to be charged.

Further, in one or more embodiments, control may be provided to a user, driver, or operator of the first vehicle such that he or she may engage in charging the second vehicle without exiting or without the need to exit the first vehicle. For example, a control component or an interface component of the first vehicle may enable an operator or user to place or engage both vehicles in paired charging modes (e.g., the first vehicle in charge providing mode and the second vehicle in charge receiving mode), guide the operator to align the first vehicle appropriately with the second vehicle, and commence charging. In this way, vehicle-to-vehicle charging may be achieved in a wireless, efficient, and safe manner.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
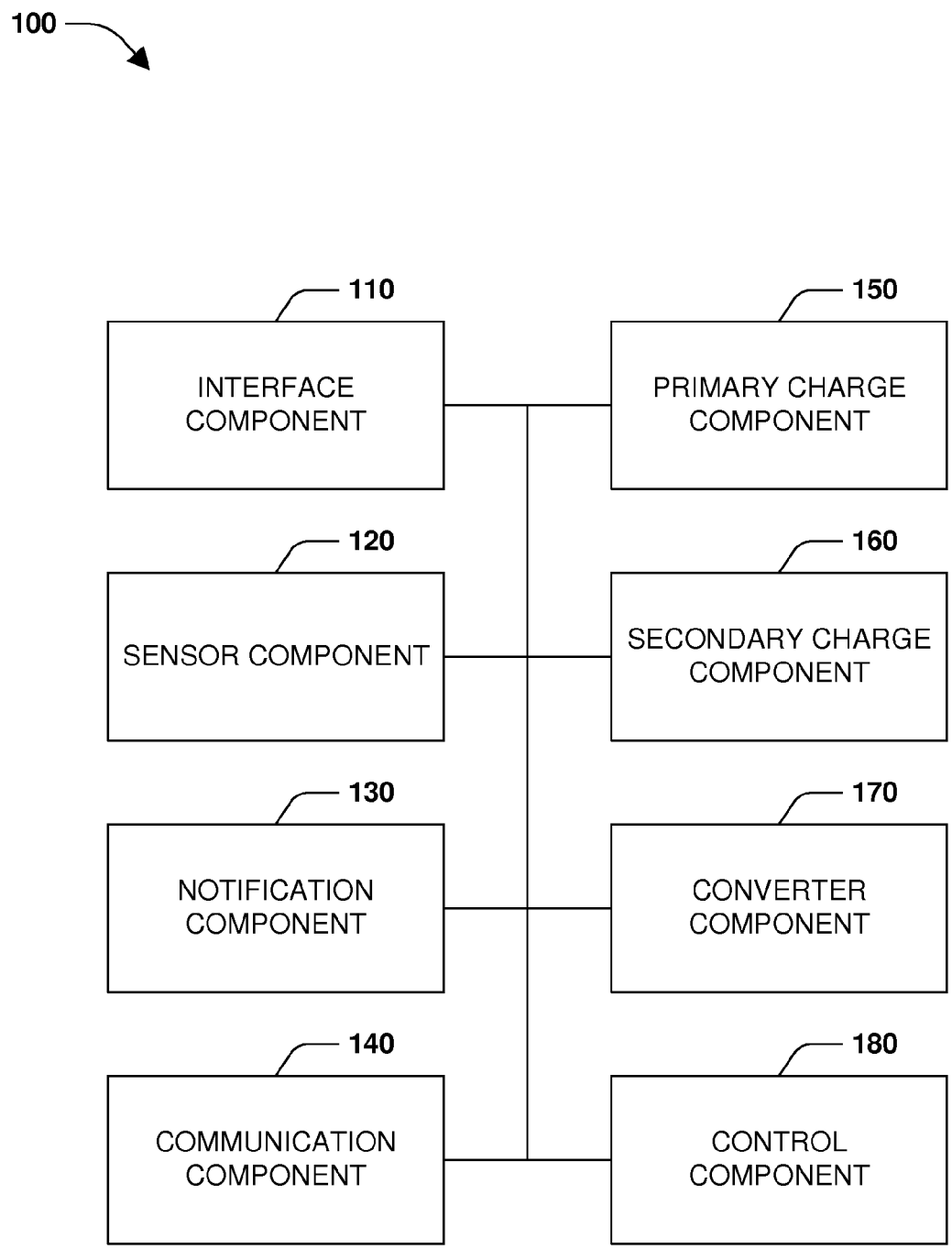
FIG. 1 is an illustration of an example component diagram of a system for vehicle-to-vehicle wireless charging, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 4:
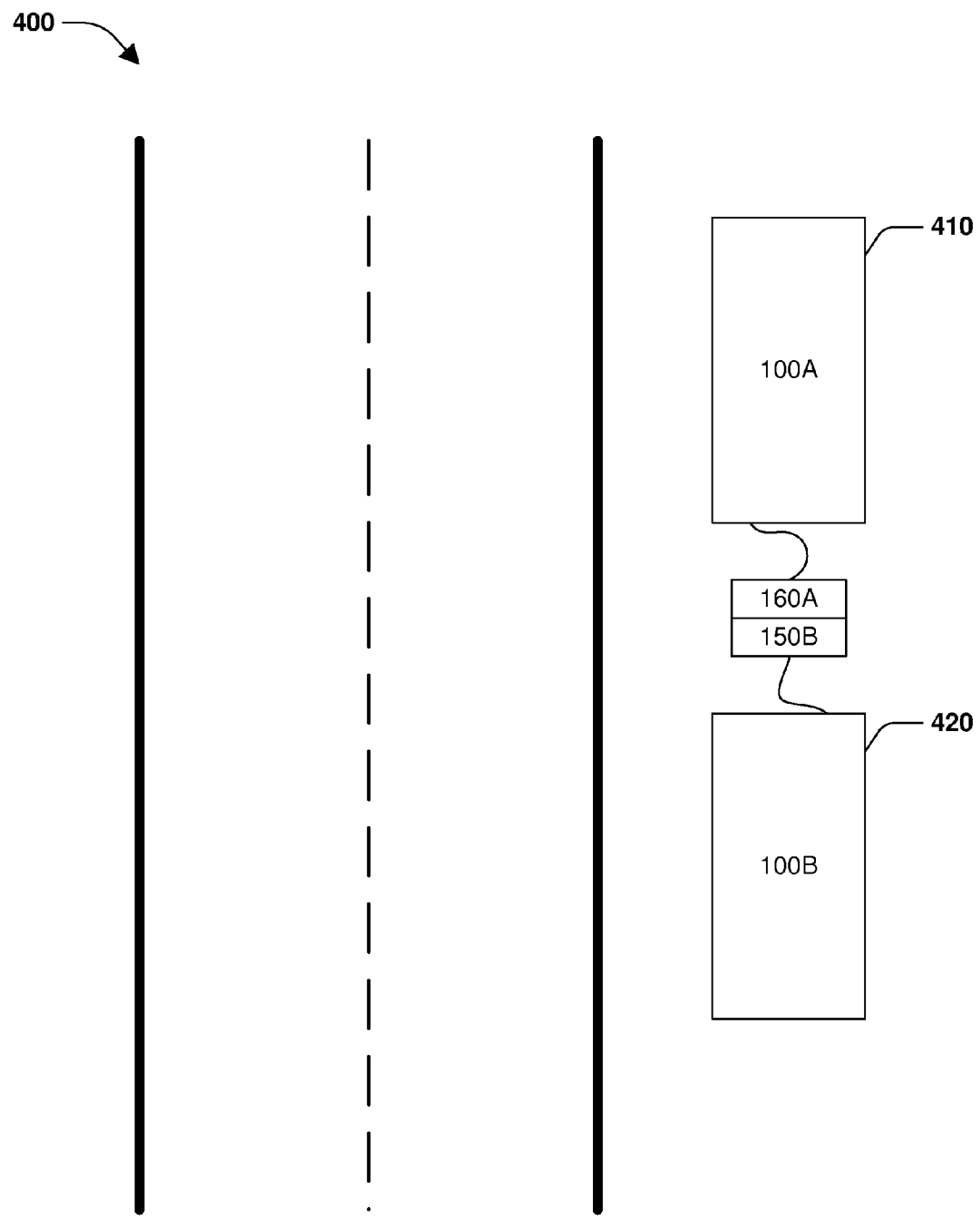
FIG. 4 is an illustration of an example scenario where vehicle-to-vehicle wireless charging is implemented, according to one or more embodiments.
Figure 8:
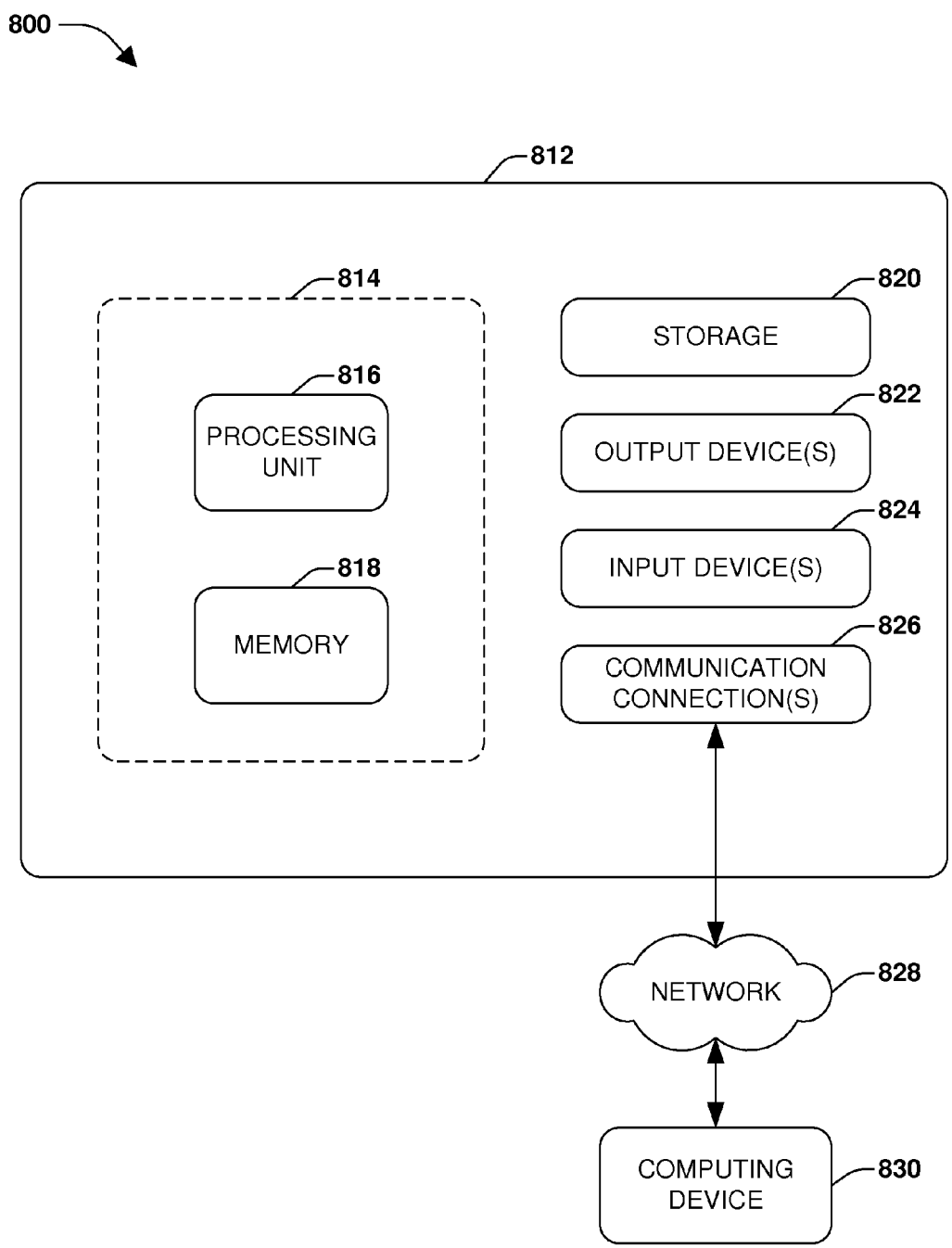
FIG. 8 is an illustration of an example computing environment where one or more of the provisions set forth herein are implemented, according to one or more embodiments.

For one or more of the figures herein, one or more boundaries, such as boundaries 160A and 1508 of FIG. 4 or boundary 814 of FIG. 8, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, the term "user" may include a driver of a vehicle, an operator of a vehicle, a passenger of a vehicle, an occupant of a vehicle, an individual (either within the vehicle or outside of the vehicle while utilizing a system for vehicle-to-vehicle wireless charging), an entity, etc. As used herein, the term "content item" may include shortcuts, icons, tiles, media items, functional icons, shortcut icons, items, applications, 'apps', etc. Further, applications or 'apps' may be launched, executed, or run (e.g., via a processing unit or memory).

A device may be or include a mobile device, a cellular phone, a personal device assistant (PDA), smart phone, pocket personal computer (PC), laptop computer, desktop computer, smart watch, or other devices having a processor, processing unit, or memory. A device may run one or more applications, programs, or 'apps'. An application may be part of a larger suite of features or interactions. Examples of applications include applications available for the iPhone™, applications for devices running the Android™ operating system, applications for BlackBerry devices, tablets, or most any other device, etc.

As used herein, a connection may include or be based on short range communication, near field communication (NFC), Wi-Fi technologies, wireless technologies, telematics, telecommunications, Bluetooth®, or other communication channels, such as universal serial bus (USB), etc. Additionally, a connection may be established utilizing multiple technologies. For example, NFC may be utilized to prepare a device to initiate a connection with a vehicle, while the connection itself may be implemented utilizing Wi-Fi, wireless technologies, telematics, etc.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for vehicle-to-vehicle wireless charging, according to one or more embodiments. The system 100 for vehicle-to-vehicle wireless charging may include an interface component 110, a sensor component 120, a notification component 130, a communication component 140, a primary charge component 150, a secondary charge component 160, a converter component 170, and a control component 180.

The interface component 110 may enable a user, a driver, or occupant to interact with or provide input, such as user input, gestures, clicks, points, selections, etc., to the system 100 for vehicle-to-vehicle wireless charging. As an example, the interface component 110 may include a touch screen, a touchpad, a trackpad, one or more hardware buttons, one or more software buttons, one or more soft buttons, one or more switches, a keypad, a microphone, one or more sensors, or other human-machine interface (HMI), etc. The interface component 110 may integrate one or more other components, such as a display component, an input receiving component, a touch screen capable of receiving touch input or gesture inputs and also be capable of rendering content, such as icons, shortcuts, a home screen, an interface, etc. In other words, the interface component 110 may include a touchscreen, a display component, or one or more other components which enable a user to interact with the system 100 for vehicle-to-vehicle wireless charging.

Accordingly, the interface component 110 may receive one or more user inputs, such as user inputs from a user, driver, or other occupant of a vehicle. In one or more embodiments, the interface component 110 may enable a driver, operator, user, or other entity to communicatively couple a device, such as a mobile device with the vehicle or the system for vehicle-to-vehicle wireless charging. Here, in these embodiments, the mobile device may be utilized by the user to interface or interact with the system 100 for vehicle-to-vehicle wireless charging. For example, if the mobile device is equipped with a touch screen or one or more buttons, the interface component 110 may enable the user to interact with the system 100 by rendering an interface which allows the user to manage the system 100. In other words, the interface component 110 may enable a user to manipulate one or more aspects of the system 100 via an application installed on a mobile device which is communicatively coupled to the vehicle (e.g., via the communication component 140).

Regardless, the interface component 110 may receive a variety of types of user inputs, such as verbal commands, spoken commands (e.g., utilizing a microphone or audio sensor), pressing of buttons, activating switches, gesture inputs, such as a swipe, a two finger swipe, a pinch and zoom, a touch (e.g., utilizing a touch screen), a press, a press and hold, a selection, a movement of a cursor, a click (e.g., utilizing a button, mouse button, track button), etc.

In one or more embodiments, the interface component 110 may receive one or more user inputs and place or engage a vehicle in a charge providing mode or a charge receiving mode based on one or more of the user inputs. As will be described herein (e.g., in FIG. 2), a vehicle equipped with a system 100A for vehicle-to-vehicle wireless charging may interact with or facilitate charging with another vehicle equipped with another system 100B for vehicle-to-vehicle wireless charging. In other words, a first vehicle equipped with a first system 100A for vehicle-to-vehicle wireless charging may charge, jump start, or supply electrical power or electrical energy to a second vehicle equipped with a second system 100B for vehicle-to-vehicle wireless charging, for example. In this example, the first vehicle or the first system 100A may be the vehicle providing electrical power and therefore, be in charge providing mode. Similarly, the second vehicle or the second system 100B may be the vehicle receiving electrical power (e.g., due to being stalled, disabled, or otherwise having little or no electrical power) and therefore, be in charge receiving mode.

Accordingly, the system of FIG. 1 may be described from different perspectives, such as a perspective associated with a system in charge providing mode or a perspective associated with a system in charge receiving mode. In one or more embodiments, a same system may operate or be capable of being placed in either mode (e.g., charge providing mode or charge receiving mode). Generally, when a vehicle is travelling, the system 100 may place or engage the vehicle in normal operating mode. However, when circumstances arise, such as when a vehicle has little or no charge, a user may utilize the interface component 110 to place or engage that vehicle in charge receiving mode. Here, in this example, the interface component 110 may receive a user input and place the vehicle in charge receiving mode based on or in response to the user input. For example, the interface component 110 may render a menu on a display of a vehicle which provides a user an option to place a vehicle in charge receiving mode. In other embodiments, the interface component 110 may place a vehicle in charge receiving mode based on a current battery level being below a threshold battery level, for example. In other words, the interface component 110 may place the vehicle in charge receiving mode (e.g., automatically) when a battery of a vehicle dies or is close to dying. In this way, the interface component 110 may place a vehicle in charge receiving mode. A vehicle may be placed in charge receiving mode utilizing manual configuration or inputs from hardware buttons, in the event that no power is available to render an interface, for example.

Similarly, when a vehicle equipped with a system 100 for vehicle-to-vehicle wireless charging is preparing to provide electrical power to another vehicle, a user may utilize the interface component 110 to place or engage that vehicle in charge providing mode. Here, in this example, the interface component 110 may receive a user input and place the vehicle in charge providing mode based on or in response to the user input. Again, the interface component 110 may render a menu on a display of a vehicle which provides a user an option to place the vehicle in charge providing mode. In this way, the interface component 110 may place a vehicle in charge providing mode. Accordingly, it may be seen that the interface component 110 may be utilized to place or engage a vehicle in one or more different modes, such as charge providing mode, charge receiving mode, or normal operation mode, etc. Examples of different user inputs which may be utilized to place or engage a vehicle in different modes or charging modes may include selection of menu items, pressing of corresponding buttons, etc. The interface component 110 may render a menu with different mode options, such as "enter charge providing mode", "enter charge receiving mode", or "enter normal operation mode" and receive corresponding user inputs, for example.

Regardless, interface components (e.g., 110A and 110B of FIG. 2) may 'pair' a first vehicle with a second vehicle such that the first vehicle is in charge providing mode and such that the second vehicle is in charge receiving mode. In one or more embodiments, multiple vehicles (e.g. two or more vehicles) may be placed in charge providing mode to provide electrical power to a vehicle in charge receiving mode. In other words, it may be possible for multiple or two or more vehicles to concurrently or simultaneously wirelessly charge a vehicle. In any event, the interface component 110 may enable users or operators of one or more vehicles to place or engage vehicles in different charging modes to facilitate vehicle-to-vehicle wireless charging.

In one or more embodiments, the interface component 110 may engage a vehicle in a charging mode, such as a charge providing mode or a charge receiving mode in an automatic fashion. For example, the interface component 110 may engage a second vehicle in charge receiving mode based on a proximity of a first vehicle (e.g., the charge providing vehicle or the charge providing vehicle to be) to the second vehicle (e.g., the charge receiving vehicle or the charge receiving vehicle to be). In other words, the interface component 110 may engage or place a vehicle in a charge providing mode when a disabled vehicle is detected, such as a vehicle equipped with a system 100 for vehicle-to-vehicle wireless charging which is low or in need of electrical power. Here, the sensor component 120 for respective vehicles may detect the other vehicle, the power level of the other vehicle, the proximity of the first vehicle to the second vehicle, or vice versa. The sensor component 120 may, in one or more embodiments, disable charging unless vehicles are within a proximity, in contact with each other, or almost within contact, for example.

A system 100 for vehicle-to-vehicle wireless charging may include a sensor component 120. The sensor component 120 enables a vehicle equipped with the system 100 for vehicle-to-vehicle wireless charging to detect one or more hazards in a surrounding environment or in a real world environment. In this way, a first vehicle, a second vehicle, or both the first vehicle and the second vehicle may monitor a surrounding environment (e.g., traffic, roadways, etc.) or a real world environment for hazards, such as oncoming traffic, passing traffic, etc. which may be on a collision course with the first vehicle or the second vehicle. For example, the sensor component 120 may include an image capture unit, a radar unit, a laser unit, an infrared unit, etc. Respective units of the sensor component 120 may thus enable the sensor component 120 to detect or monitor for one or more hazards within a real world environment or a surrounding environment. For example, the image capture unit may capture one or more successive image snapshots and extrapolate or infer whether or not an object (e.g., a vehicle or oncoming traffic) has an anticipated collision course with one or more of the vehicles (e.g., the first vehicle or the second vehicle) or users standing nearby, for example. In this way, the sensor component 120 may monitor or detect one or more hazards within an environment.

The sensor component 120 may also utilize technologies such as radar technology or laser technology to facilitate detection of objects or movement associated therewith. The sensor component 120 may include multiple sensors or units which may be mounted at various locations on a vehicle. For example, with regard to image capture units, the sensor component 120 may include a front image capture unit, a dashboard image capture unit, a side image capture unit, a rear view image capture unit, etc. The sensor component 120 may sample frequency of oncoming traffic or other statistics associated with objects within a real world environment, such as average velocity of passing traffic or oncoming traffic.

Further, the notification component 130 may provide notifications or alerts to indicate to one or more users that an area is congested or that an area where a vehicle is located is a high risk area for wireless charging (e.g., due to average vehicle velocity). Further, the notification component 130 may infer or calculate a likelihood or risk factor for accidents (e.g., a collision due to traffic in the area) based on velocity of traffic detected by the sensor component 120 or volume of traffic detected by the sensor component 120. Here, the notification component 130 may calculate or determine volume of traffic while the sensor component 120 may detect velocity associated with detected traffic or averages associated therewith. The interface component 110 may regulate or control when a vehicle may enter a charging mode, such as charge providing mode or charge receiving mode. For example, the interface component 110 may disable charging modes based on a proximity of one or more of the detected hazards from the vehicle. In other words, if the sensor component 120 detects multiple hazards and the interface component 110 determines that the risk factor is too high (e.g., over a threshold risk factor), the interface component 110 may not enable vehicle-to-vehicle wireless charging to be enabled or for a vehicle to enter a charging mode, such as charge providing mode or charge receiving mode, unless the user acknowledges such risks or clears notifications provided by the notification component 130 (as will be discussed herein).

In one or more embodiments, when the sensor component 120 detects one or more hazards, such as oncoming traffic which is determined or inferred to have a collision course with one or more of the vehicles engaged in wireless charging (e.g., prior to, during, or after the charging) or while a vehicle is stationary or in park, the notification components 130 of respective vehicles may provide, generate, or render one or more notifications or one or more alerts based on one or more of the detected hazards or a hazard having or being associated with an inferred collision course with a vehicle, such as the first vehicle (e.g., in charge providing mode) or the second vehicle (e.g., in charge receiving mode). In other words, a vehicle may provide notifications based on detected hazards within a real world environment or a surrounding environment, thereby alerting users or individuals of potentially dangerous scenarios. Further, a notification component 130 may notify or alert users of when charging should be conducted, when charging should not be conducted, or scenarios to avoid, for example.

In this way, the notification component 130 may render one or more alerts based on one or more detected hazards within the real world environment. For example, the notification component 130 may render one or more audio alerts in response to a detected hazard. The audio alert may be internal to the vehicle if the sensor component 120 detects that a user or individual is seated within a vehicle. The audio alert may be audible outside of the vehicle or be external to the vehicle based on a presence of a user or individual outside of the vehicle. For example, if a user exits a vehicle to facilitate vehicle-to-vehicle wireless charging, the sensor component 120 may detect that the user has left the vehicle. Similarly, if other occupants remain in the vehicle, the system 100 for vehicle-to-vehicle wireless charging may have the notification component 130 provide audio alerts both internally within the vehicle and externally to the real world environment (e.g., honking a horn), such as when another vehicle is detected and determined or inferred to be on a collision course with the vehicle equipped with the system 100 for vehicle-to-vehicle wireless charging.

As an example, the notification component 130 may play a pre-recorded warning or otherwise provide notifications for users to clear an area or a charging proximity when wireless charging is about to commence or be initiated. Further, when an interface component of a first vehicle (e.g., 110A of FIG. 2) places the first vehicle in charge providing mode and an interface component of a second vehicle (e.g., 110B of FIG. 2) places the second vehicle in charge receiving mode, respective interface components 110A and 110B may share notifications generated between vehicles via communications component(s) 140 of respective vehicles, such as via a connection, a wireless connection, a telematics channel, etc.

For example, if a first vehicle is in charge providing mode and a second vehicle is in charge receiving mode, the first vehicle may be considered to be 'paired' with the second vehicle (e.g., though additional vehicles may engage in wireless charging). Continuing with this example, if a sensor component 120 of the first vehicle detects a hazard (e.g. prior to the sensor component 120 of the second vehicle detecting the same hazard or because the sensor component 120 of the first vehicle is aligned to detect the hazard), the communication component 140 of the first vehicle may transmit a notification to the communication component 140 of the second vehicle. The notification component 130 of the first vehicle may provide an alert or notification for users or individuals within the first vehicle. Additionally, the transmittal of the notification via the communication component(s) 140 of respective vehicles enables a notification component 130 the second vehicle to alert users or provide notifications accordingly. In this way, notifications may be broadcast between vehicles which are paired, for example.

In one or more embodiments, the sensor component 120 and notification component 130 of a vehicle may facilitate vehicle-to-vehicle wireless charging, such as by detecting orientation or proximity of vehicles or detecting objects which may reduce charging efficiency or pose as potential hazards. For example, the sensor component 120 may detect a position of a first vehicle (e.g., a vehicle providing charge or a vehicle in charge providing mode) relative to a position of a second vehicle (e.g., a disabled vehicle or a vehicle in charge receiving mode).

As discussed herein, electromagnetic induction may be utilized to facilitate wireless charging between vehicles, such as between a first vehicle and a second vehicle. When induction is utilized, wireless charging may be promoted or may be more efficient when charge components of vehicles are closer in proximity. Accordingly, the sensor component 120 may detect a proximity of a first vehicle in charge providing mode to a second vehicle in charge receiving mode and guide a user or driver to orient the first vehicle (e.g., which is not disabled) to be within a charging proximity of the second vehicle or such that a primary charge component 150 (e.g., of the first vehicle) is within the charging proximity of the secondary charge component 160 (e.g., of the second vehicle). Further, the notification component(s) 130 of respective vehicles may provide notifications to guide the user or driver to engage the vehicles in an appropriate manner. In other words, a system 100 may notify a driver to move a vehicle having or providing electrical power via wireless charging closer to another vehicle to be charged via wireless charging. In this way, the sensor component 120 and the notification component 130 may detect positioning of vehicles and guide users or drivers accordingly by providing notifications or alerts based on orientation factors or proximities detected by the sensor component 120, for example.

In one or more embodiments, the sensor component 120 may detect objects which may interfere with charging, such as objects which may be associated with electromagnetic shielding or objects which may be affected by electromagnetic induction. In other words, the sensor component 120 may detect objects which have the potential to be charged by the primary charge component 150 of a vehicle, such as objects which may be shaped similarly to an induction coil, for example. Other objects detected by the sensor component 120 may merely interfere with wireless charging by reducing efficiency of the charging, such as by magnetically shielding a charge component. Regardless, the notification component 130 may render one or more notifications or one or more alerts based on objects detected by the sensor component 120.

The communication component 140 may enable a vehicle to communicate, transfer, transmit, receive, etc. data associated with that vehicle or another vehicle. A second vehicle (e.g., the vehicle with no charge) may communicate one or more vehicle specifications to a first vehicle to facilitate wireless charging. This enables the vehicle-to-vehicle wireless charging system 100 of the first vehicle to provide power or charging to the second vehicle accordingly. For example, a communication component 140 may transmit or receive one or more vehicle specifications or one or more vehicle attributes associated with a vehicle (e.g., a first vehicle) to a communication component of another vehicle (e.g., a second vehicle). Vehicle specifications may include power specifications, operating voltages, current ranges, open circuit voltages, ampere-hours, cranking amperes, reserve capacity, charge level of a battery, etc. In this way, the communication component 140 may enable the system 100 for vehicle-to-vehicle wireless charging to communicate specifications, attributes, statuses, such as battery level, etc. with another vehicle.

In one or more embodiments, the communication component 140 and the interface component 110 may facilitate wireless charging by finding other vehicles in an area or a radius which are capable of wireless charging or are equipped with similar systems and notify drivers of those vehicles that wireless charging is requested, such as when the interface component 110 of a vehicle places or engages a vehicle in charge receiving mode. For example, when the interface component 110 places a vehicle in charge receiving mode (e.g., automatically when the battery dies, based on a user input, or in response to a user input), the communication component 140 may transmit a beacon to other drivers in the area driving or operating vehicles equipped with systems 100 for vehicle-to-vehicle wireless charging. Here, in this example, drivers within a ten mile radius may receive the beacon via their respective communication components 140 and be notified via their notification components 130. The notified drivers or authorities (e.g., for safety reasons) may be provided with contact information for the user or driver of the disabled vehicle to promote use of the wireless charging feature, for example.

The communication component 140 may facilitate pairing of two or more vehicles. For example, the communication component(s) 140 of two vehicles may have a connection or be communicatively coupled via a channel, such as a telematics channel. Further, the communication component 140 may enable broadcasting or sharing of functionalities across multiple vehicles. For example, if a sensor component 120 of a second vehicle is broken or disabled, information from a sensor component 120 of a first vehicle may be shared or broadcast to the second vehicle to promote pairing as well as safety.

If a second vehicle is disabled, in need of a jump start, or otherwise in need of electrical power, a first vehicle may be parked or stationed within a charging proximity of the second vehicle. The first vehicle may be oriented such that a primary charge component 150 of the first vehicle is within a charging proximity of a secondary charge component 160 of the second vehicle. In one or more embodiments, the primary charge component 150 and the secondary charge component 160 may include one or more induction coils to facilitate wireless charging via electromagnetic induction. Vehicle-to-vehicle wireless charging may be achieved through electromagnetic induction utilizing these charge components 150 (e.g., from a first vehicle) and 160 (e.g., from a second vehicle). A first vehicle may include a primary charge component 150 and a second vehicle may include a secondary charge component 160. Together when these two components are in close enough proximity or within a charging proximity of each other, respective charge components 150 and 160 may form an electrical transformer.

As an example, the primary charge component 150 of the first vehicle may include one or more induction coils. Similarly, the secondary charge component 160 of the second vehicle may also include one or more induction coils. When current, such as a charging current, is passed through the primary charge component 150, a time varying magnetic field is generated. Accordingly, when the secondary charge component 160 is placed within a charging proximity of the primary charge component 150, exposure to this time varying magnetic field induces a current in the secondary charge component, thereby providing electrical power to the second vehicle. Explained yet another way, the primary charge component 150 of a first vehicle may generate a time varying magnetic field based on a charging current or otherwise act as a 'charging base station'. The secondary charge component 160 of a second vehicle may generate an inducted current based on exposure to the time varying magnetic field caused by the primary charge component 150. Here, the secondary charge component 160 may induce a current based on the exposure to the time varying magnetic field or otherwise take power from the electromagnetic field and convert that power into electrical current which may be utilized to charge a battery of the second vehicle. In one or more embodiments, the primary charge component 150 or the secondary charge component 160 may be moveable, portable, or removable from a vehicle.

In one or more embodiments, the secondary charge component 160 may be connected with a battery of a vehicle to facilitate charging or wireless charging. In other embodiments, engaging a vehicle in charge receiving mode (e.g., via the interface component 110) may include electrically connecting a component associated with induced current to a battery of the vehicle. For example, the interface component 110 may place or engage a vehicle in charge receiving mode by electrically connecting the secondary charge component 160 to a battery of the vehicle via a switch. In one or more embodiments, a user, driver, or operator of a vehicle may manually connect the secondary charge component 160 to the battery by manually operating the switch (e.g., due to no power or safety reasons). Connecting the secondary charge component 160 to a battery thereby enables the battery to be charged upon commencement of wireless charging (e.g. when the primary charge component 150 is within a charging proximity and provided with a charging current).

In one or more embodiments, the sensor component 120 may determine a charge level of a battery of a vehicle. For example, when the sensor component 120 determined that a battery is 95% charged, the interface component may automatically disconnect the secondary charge component 160 of the vehicle from the battery of the vehicle such that overcharging of the battery does not occur. In this way, the interface component 110 may automatically disengage a vehicle from charge receiving mode. Additionally, the communication component 140 of a second vehicle (e.g., in charge receiving mode) may notify the communication component 140 of a first vehicle (e.g., in charge providing mode) or transmit a battery level of the battery of the second vehicle. The communication component 140 of the first vehicle may receive the battery level and similarly, have the interface component 110 of the first vehicle disengage or disable charge providing mode for the first vehicle (e.g., due to the charged status of the battery of the second vehicle).

In one or more embodiments, a converter component 170 may convert a voltage associated with a secondary charge component 160 to a voltage associated with one or more vehicle specifications of a vehicle, such as a vehicle in charge receiving mode. In other words, the converter 170 may convert a voltage associated with the induced current (e.g., associated with the secondary charge component 160) to a voltage associated with one or more vehicle specifications of the vehicle receiving power. This enables a vehicle to make adjustments to voltage, current, or power settings associated with a vehicle or a component of a vehicle accordingly (e.g., to suit a make, model, year, trim, etc. of a vehicle), unlike jumper cables, for example. Accordingly, it can be seen that the converter component 170 may enable a second vehicle to step up or step down voltage levels according to system voltage levels (e.g. 24 V or 12V) for that vehicle. The converter component 170 may include DC-to-DC converters, voltage regulators, linear regulators, or other types of power conversion systems.

The control component 180 or the sensor component 120 may enable a monitoring of a charge level or a battery level of a battery of a vehicle. The control component 180 may cause the interface component 110 to render status updates as to the battery level or charge level to enable a user or operator to see the battery level of a vehicle which is engaged in wireless charging. The control component 180 may calculate an estimated charge time, an inferred charge time, a time until a vehicle may be started or ignition engaged, etc. based on a detected rate of charge, a proximity of the vehicles, a charging current, etc. (e.g., via the sensor component 120). Further, the control component 180 may adjust or control an amperage associated with the charging current based on one or more vehicle specifications or vehicle attributes of the other vehicle (e.g., in charge receiving mode), distance between vehicles or corresponding charge components, size of induction coils within respective charge components, etc. In this way, the control component 180 may facilitate one or more aspects of vehicle-to-vehicle wireless charging.

If the sensor component 120 detects a short circuit, etc. the control component 180 may disable wireless charging for a corresponding vehicle (e.g., via disabling charging modes) and by communicating an error to a paired communication component 140 of another vehicle, which may also disable charging mode in a similar fashion, for example.

In one or more embodiments, the control component 180, the interface component 110, the sensor component 120, and the notification component 130 may enable a user to start a disabled vehicle (e.g., a second vehicle) without getting into the second vehicle or leaving their vehicle (e.g., a first vehicle). Accordingly, FIG. 2-FIG. 6 may be described with reference to one or more components of the system 100 of FIG. 1, implemented in a first vehicle and a second vehicle.

Figure 2:
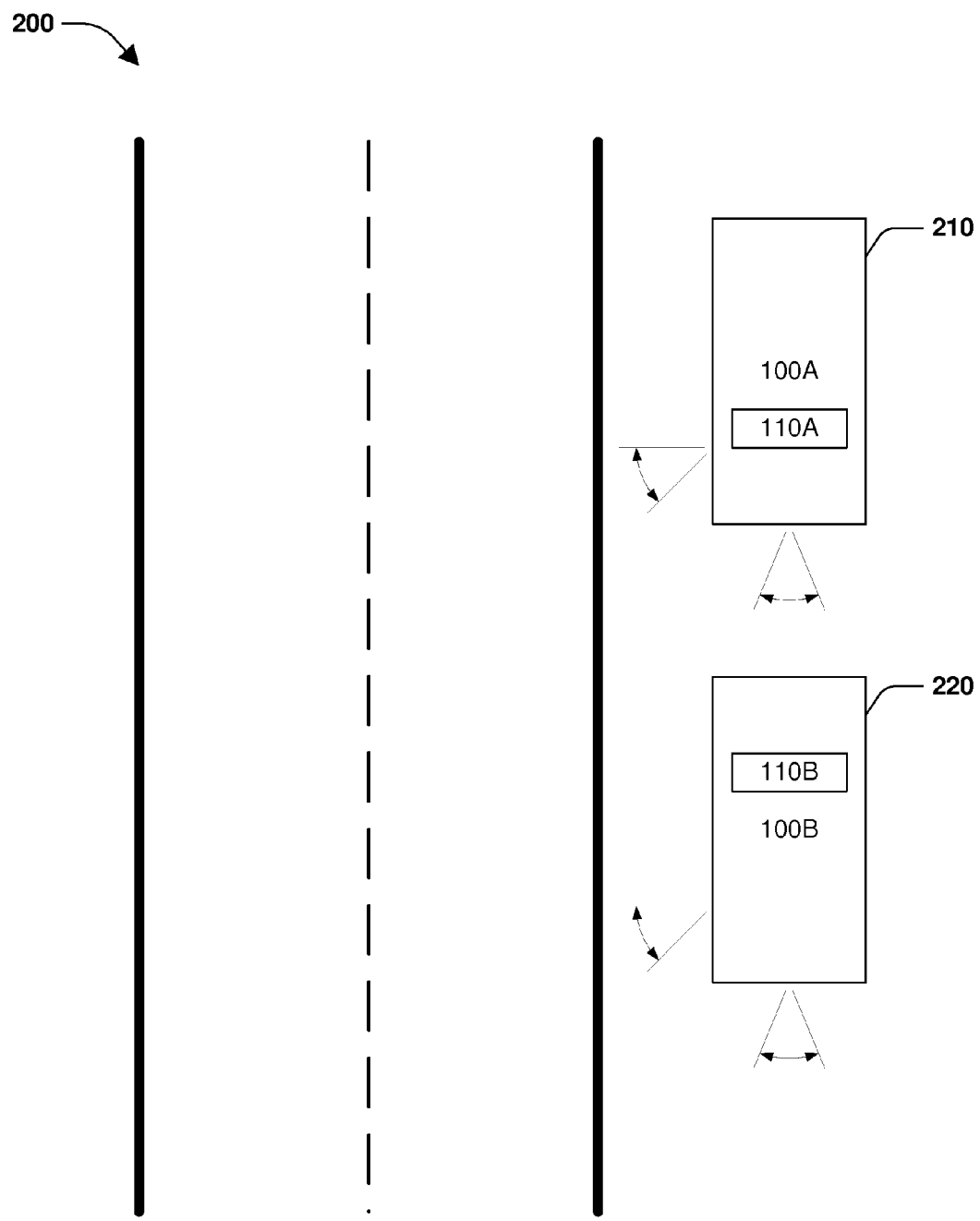
FIG. 2 is an illustration of an example scenario where vehicle-to-vehicle wireless charging is implemented, according to one or more embodiments.

FIG. 2 is an illustration of an example scenario 200 where vehicle-to-vehicle wireless charging is implemented, according to one or more embodiments. In FIG. 2, a second vehicle 210 is a disabled vehicle (e.g., in need of electrical power) and a first vehicle 220 is a vehicle which may supply electrical power. The second vehicle is equipped with a second system 100A for vehicle-to-vehicle wireless charging (e.g., having interface component 110A) and the first vehicle is equipped with a first system 100B for vehicle-to-vehicle wireless charging (e.g., having interface component 110B). In this example, the second vehicle 210 may have been placed in charge receiving mode automatically by interface component 110A. Alternatively, the driver of the first vehicle 220 may utilize his or her interface component 110B to place or engage the disabled vehicle 210 in charge receiving mode.

The interface component 110B of the first vehicle 220 may automatically place the first vehicle 220 in charge providing mode based on detecting the second vehicle 210 being disabled or a driver of the first vehicle 220 may manually select an option via an interface rendered by the interface component 110B to have vehicle 220 enter charge providing mode. Regardless, when respective vehicles 210 and 220 have entered charge receiving mode and charge providing mode, sensor components (e.g., 120 of FIG. 1) may detect one or more hazards or potential hazards and notification component 130 may provide notifications based thereon.

Figure 3:
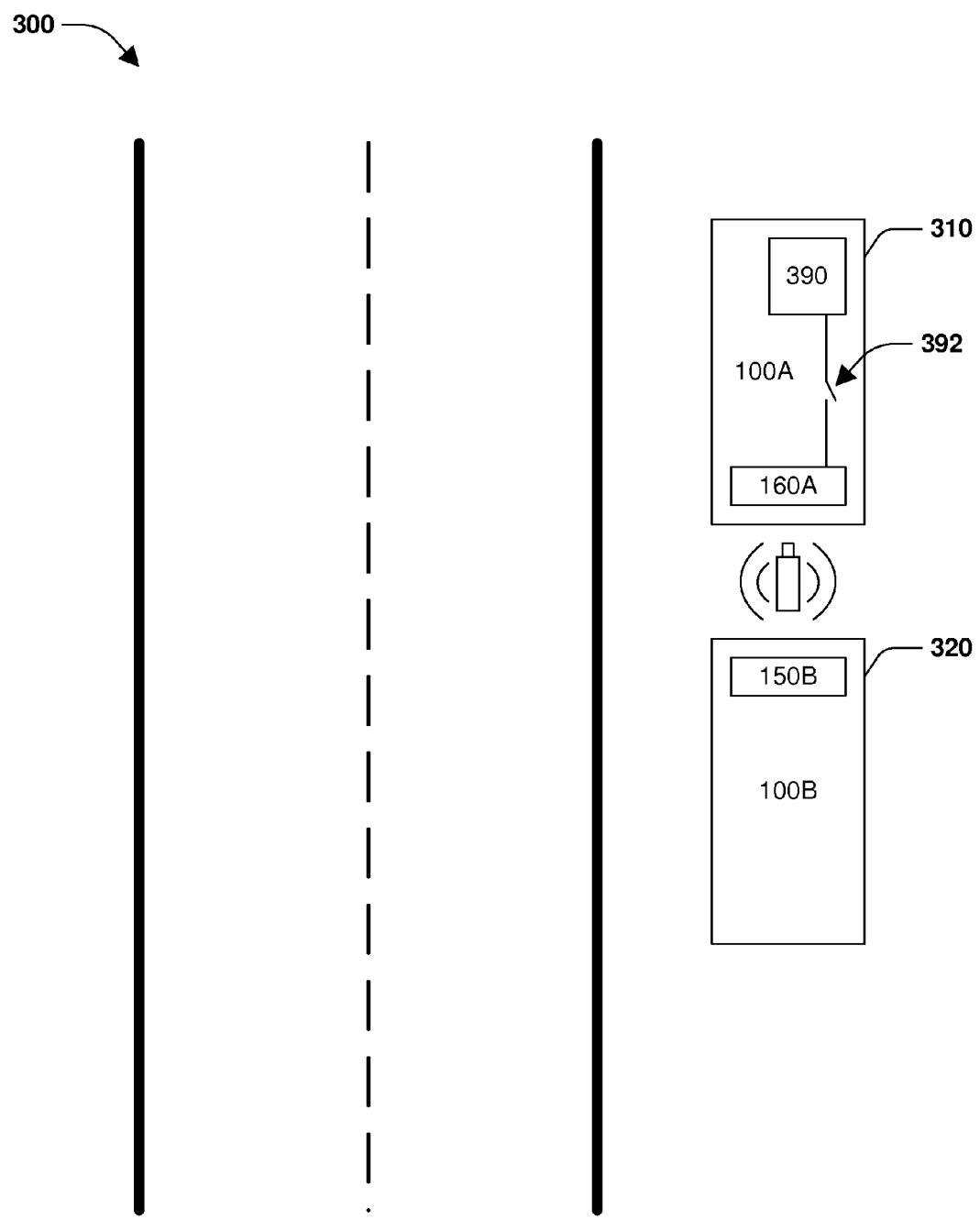
FIG. 3 is an illustration of an example scenario where vehicle-to-vehicle wireless charging is implemented, according to one or more embodiments.

FIG. 3 is an illustration of an example scenario 300 where vehicle-to-vehicle wireless charging is implemented, according to one or more embodiments. In FIG. 3, an example configuration of a secondary charge component 160A for a second vehicle 310 is illustrated. Additionally, primary charge component 150B for a first vehicle 320 can be seen. Here, in this example, the secondary charge component 160A may be in the rear of the vehicle 310 and the primary charge component 150B may be in the front of the vehicle 320. In this example, a driver of the first vehicle 320 may pull up behind the second vehicle 310 to initiate wireless charging. However, other embodiments may be implemented where respective charge components 160A and 150B are located at other positions, such as both in the front, both in the back, reversed, on the side, etc. Additionally, a battery 390 of the second vehicle 310 may be electrically connected to the secondary charge component 160A of the second vehicle 310 via a switch 392. As discussed, the switch 392 may be operated manually or automatically, such as via an interface component (e.g., 110 of FIG. 1).

Further, in one or more embodiments, control may be provided to a user, driver, or operator of the first vehicle (e.g., via an interface component 110 or control component 180) such that he or she may engage in charging the second vehicle 310 without exiting or without the need to exit the first vehicle 320. For example, a control component 180 or an interface component 110 of the first vehicle 320 may enable an operator or user to place both vehicles 310 and 320 in paired charging modes (e.g., the first vehicle 320 in charge providing mode and the second vehicle 310 in charge receiving mode via the communication component 140), guide (e.g., via notifications, directions, or prompts from the notification component 130) the operator to align the first vehicle 320 appropriately with the second vehicle 310, and commence charging. In this way, vehicle-to-vehicle charging may be achieved in a wireless, efficient, and safe manner, while providing the benefit of enabling a user or driver to have the option of not leaving or exiting a vehicle.

FIG. 4 is an illustration of an example scenario 400 where vehicle-to-vehicle wireless charging is implemented, according to one or more embodiments. In FIG. 4, it can be seen that the primary charge component 160A of the first vehicle 410 equipped with a first system 100A for vehicle-to-vehicle wireless charging may be portable, moveable, or removable from the first vehicle 410. Similarly, the secondary charge component 150B of the second vehicle 420 equipped with a second system 100B for vehicle-to-vehicle wireless charging may be portable, moveable, or removable from the second vehicle 420. Although respective charge components 160A and 150 may appear to be in contact, it will be appreciated that respective components are illustrated in this manner to illustrate that respective components are within charging proximity of one another and not because wired charging is occurring.

In one or more embodiments, a system 100 for vehicle-to-vehicle wireless charging may be utilized to provide charge by enabling a vehicle to act as a charging station to an electric vehicle or a hybrid vehicle equipped with a similar system, for example.

Figure 5:
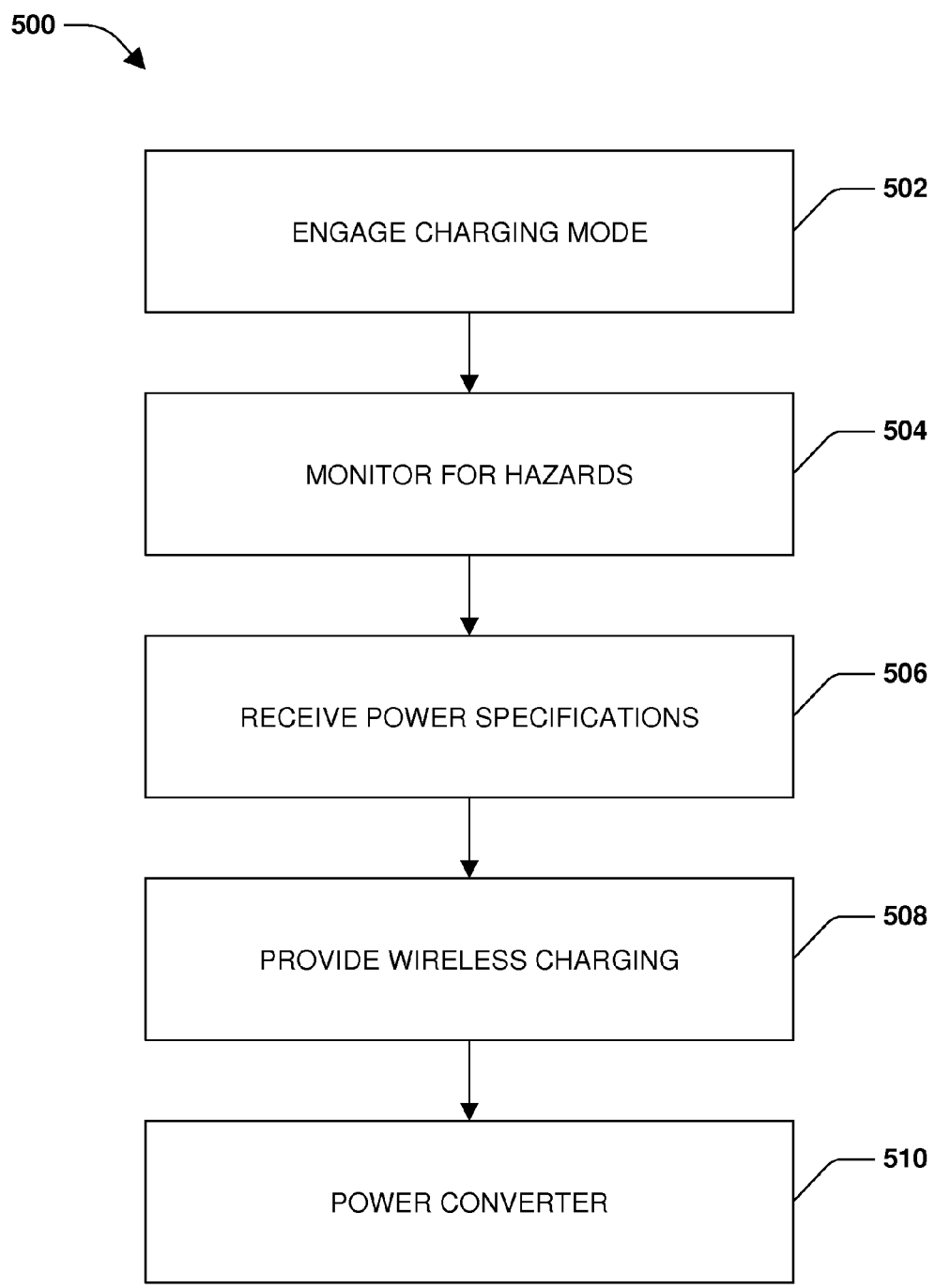
FIG. 5 is an illustration of an example flow diagram of a method for vehicle-to-vehicle wireless charging, according to one or more embodiments.

FIG. 5 is an illustration of an example flow diagram of a method 500 for vehicle-to-vehicle wireless charging, according to one or more embodiments. At 502, a vehicle may enter charge providing mode. At 504, monitoring for hazards may be enabled. At 506, power specifications or vehicle specifications of another vehicle may be received. At 508, wireless charging may be provided (e.g., via a charging current). At 510, the charging current may be adjusted or other power conversion provided.

Figure 6:
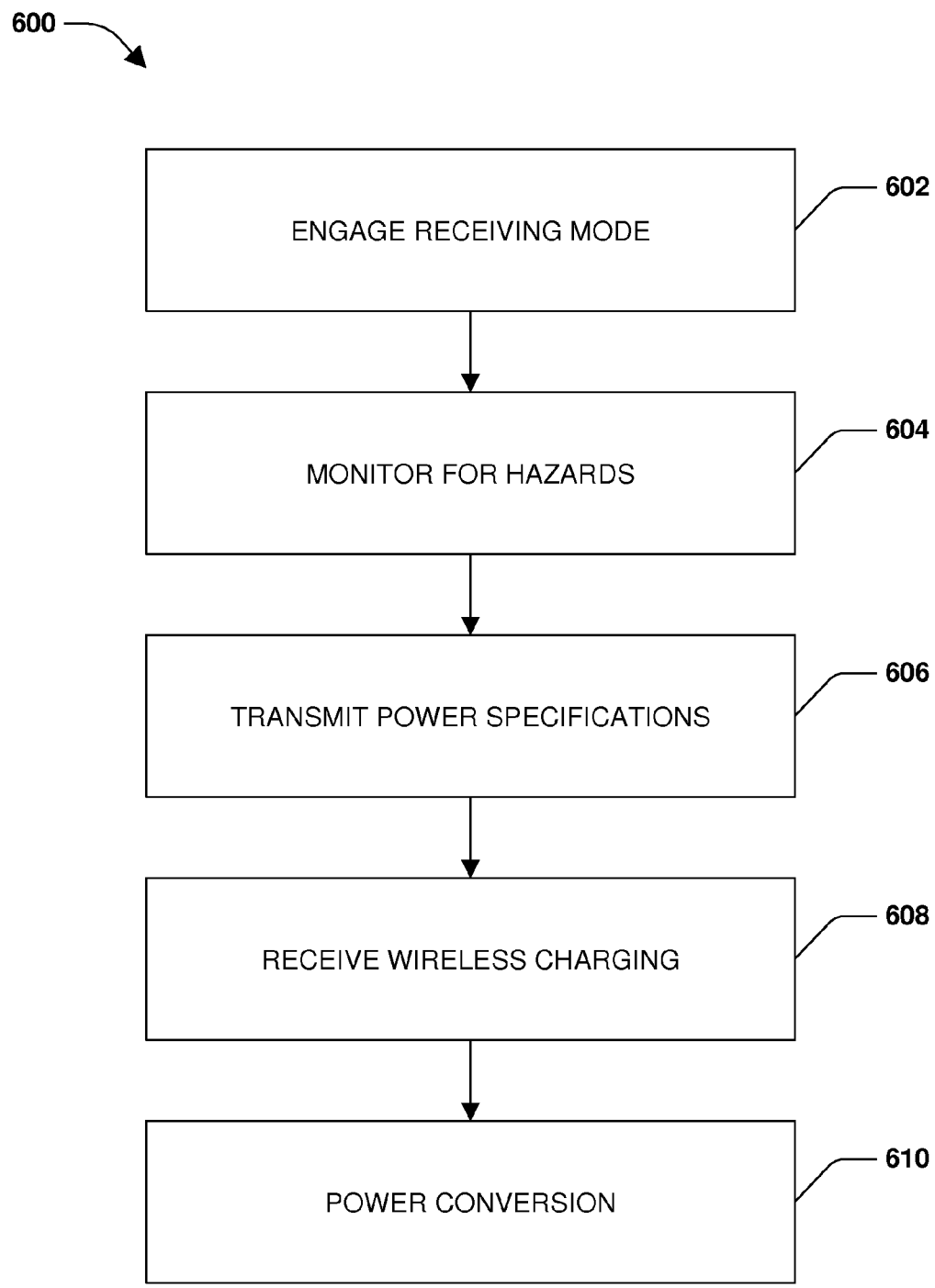
FIG. 6 is an illustration of an example flow diagram of a method for vehicle-to-vehicle wireless charging, according to one or more embodiments.

FIG. 6 is an illustration of an example flow diagram of a method 600 for vehicle-to-vehicle wireless charging, according to one or more embodiments. At 602, a vehicle may be engaged in charge receiving mode. At 604, hazard monitoring may be engaged. At 606, power specifications or vehicle specifications or attributes may be transmitted. At 608, wireless charging may be received (e.g., via electromagnetic induction). At 610, power may be converted or voltages may be stepped up or down or otherwise regulated.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 7:
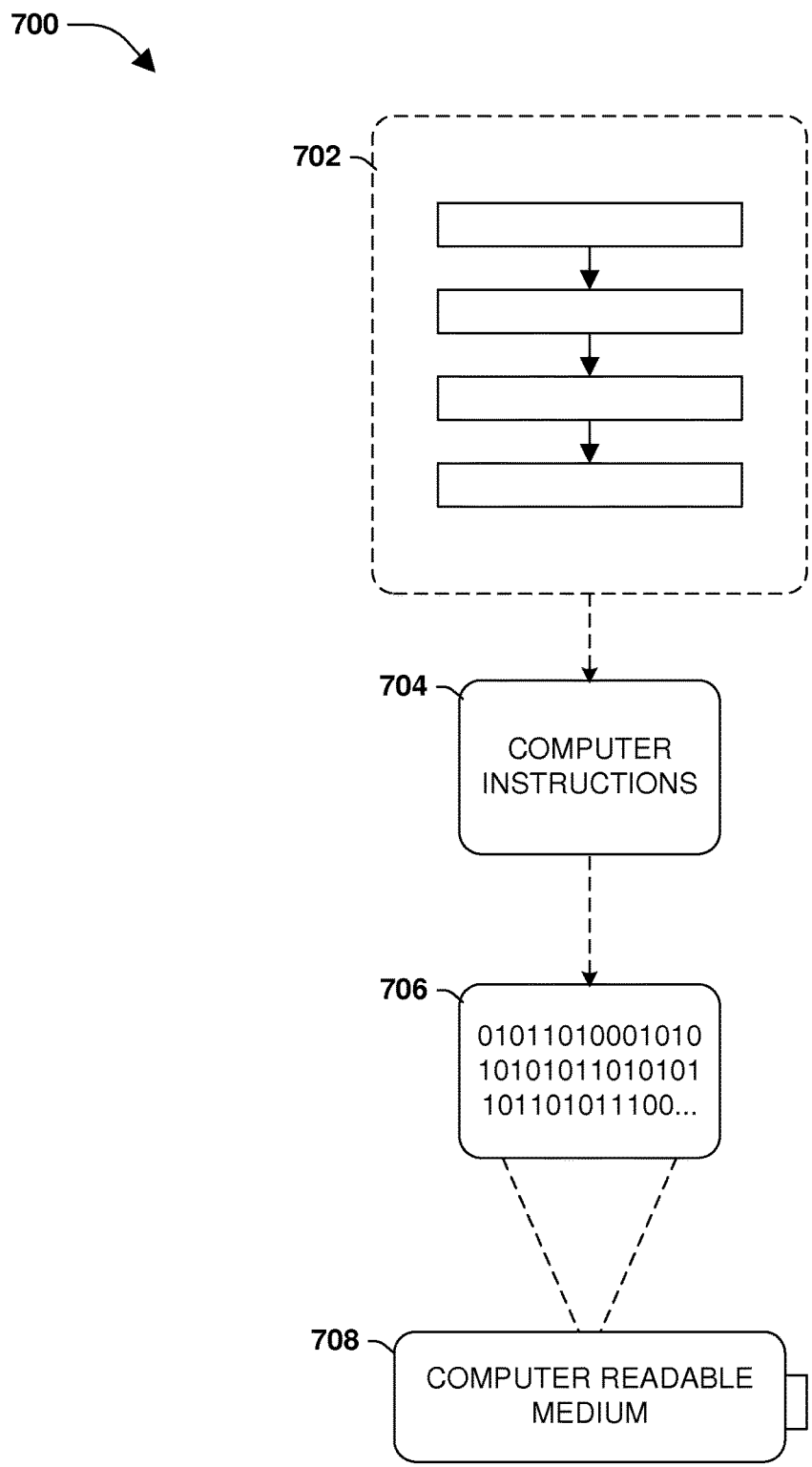
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method 702, such as the method 500 of FIG. 5 or the method 600 of FIG. 6. In another embodiment, the processor-executable instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices.

According to one or more aspects, a system for vehicle-to-vehicle wireless charging is provided, including an interface component, a sensor component, a notification component, and a secondary charge component. The interface component may receive a user input and place a vehicle in a charge receiving mode based on the user input. The sensor component may detect one or more hazards in a real world environment. The notification component may render one or more alerts based on one or more detected hazards within the real world environment. The secondary charge component may generate an induced current based on exposure to a time varying magnetic field.

The interface component may place the vehicle in the charge receiving mode by electrically connecting the secondary charge component to a battery of the vehicle via a switch. The sensor component may include an image capture unit, a radar unit, a laser unit, or an infrared unit. The notification component may render one or more audio alerts based on one or more of the detected hazards. The secondary charge component may include one or more induction coils. The system may include a converter component converting a voltage associated with the secondary charge component to a voltage associated with one or more vehicle specifications associated with the vehicle. The system may include a communication component transmitting one or more vehicle specifications of the vehicle. The system may include a control component monitoring a charge level of a battery of the vehicle. The communication component may transmit the charge level of the battery. The notification component may render one or more of the alerts based on a proximity of another vehicle to the vehicle.

According to one or more aspects, a system for vehicle-to-vehicle wireless charging is provided, including an interface component, a sensor component, a notification component, and a primary charge component. The interface component may receiving a user input and placing a vehicle in a charge providing mode based on the user input. The sensor component may detect one or more hazards in a real world environment. The notification component may render one or more alerts based on one or more detected hazards within the real world environment. The primary charge component may generate a time varying magnetic field based on a charging current.

The interface component may place the vehicle in the charge providing mode based on a proximity of one or more of the detected hazards from the vehicle. The sensor component may include an image capture unit, a radar unit, a laser unit, or an infrared unit. The primary charge component may include one or more induction coils. The system may include a communication component receiving one or more vehicle specifications of another vehicle, a charge level of a battery of another vehicle, or a status of another vehicle. The system may include a control component adjusting an amperage of the charging current based on one or more of the vehicle specifications of the other vehicle.

According to one or more aspects, a method for vehicle-to-vehicle wireless charging is provided, including engaging a vehicle in a charge receiving mode, detecting one or more hazards in a real world environment, rendering one or more notifications based on one or more detected hazards within the real world environment, and inducing a current based on exposure to a time varying magnetic field. The method may include engaging the vehicle in the charge receiving mode by electrically connecting a component associated with the induced current to a battery of the vehicle. The method may include converting a voltage associated with the induced current to a voltage associated with one or more vehicle specifications of the vehicle. The method may include monitoring a charge level of a battery of the vehicle.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for vehicle-to-vehicle wireless charging, comprising:
    an interface component receiving a user input and placing a first vehicle in a charge receiving mode based on the user input;
    a sensor component detecting one or more hazards in a real world environment;
    a notification component transmitting one or more alerts based on the one or more detected hazards to a second vehicle to orient the second vehicle within a charging proximity of the first vehicle; and
    a secondary charge component generating an induced current based on exposure to a time varying magnetic field generated by the second vehicle when the second vehicle is oriented within the charging proximity of the first vehicle.

2. The system of claim 1, wherein the interface component places the first vehicle in the charge receiving mode by electrically connecting the secondary charge component to a battery of the first vehicle via a switch.

3. The system of claim 1, wherein the sensor component comprises an image capture unit, a radar unit, a laser unit, or an infrared unit.

4. The system of claim 1, wherein the notification component renders one or more audio alerts based on one or more of the detected hazards.

5. The system of claim 1, wherein the secondary charge component comprises one or more induction coils.

6. The system of claim 1, comprising a converter component converting a voltage associated with the secondary charge component to a voltage associated with one or more vehicle specifications associated with the first vehicle.

7. The system of claim 1, comprising a communication component transmitting one or more vehicle specifications of the first vehicle.

8. The system of claim 1, comprising a control component monitoring a charge level of a battery of the first vehicle.

9. The system of claim 8, comprising a communication component transmitting the charge level of the battery.

10. The system of claim 1, wherein the notification component transmits one or more of the alerts based on a proximity of the second vehicle to the first vehicle.

11. A system for vehicle-to-vehicle wireless charging, comprising:
    an interface component receiving a user input and placing a first vehicle in a charge providing mode based on the user input;
    a sensor component detecting one or more hazards in a real world environment;
    a notification component rendering one or more alerts based on the one or more detected hazards to orient the first vehicle within a charging proximity of a second vehicle; and a primary charge component generating a time varying magnetic field based on a charging current when the first vehicle is oriented within the charging proximity of the second vehicle.

12. The system of claim 11, wherein the interface component places the first vehicle in the charge providing mode based on a proximity of one or more of the detected hazards from the first vehicle.

13. The system of claim 11, wherein the sensor component comprises an image capture unit, a radar unit, a laser unit, or an infrared unit.

14. The system of claim 11, wherein the primary charge component comprises one or more induction coils.

15. The system of claim 11, comprising a communication component receiving one or more vehicle specifications of the second vehicle, a charge level of a battery of the second vehicle, or a status of the second vehicle.

16. The system of claim 15, comprising a control component adjusting an amperage of the charging current based on one or more of the vehicle specifications of the second vehicle.

17. A method for vehicle-to-vehicle wireless charging, comprising:

engaging a first vehicle in a charge receiving mode;

detecting one or more hazards in a real world environment;

transmitting one or more notifications based on the one or more detected hazards to the second vehicle to orient the second vehicle within a charging proximity of the first vehicle; and inducing a current in the first vehicle based on exposure to a time varying magnetic field generated by the second vehicle when the second vehicle is oriented within the charging proximity of the first vehicle.

18. The method of claim 17, wherein engaging the first vehicle in the charge receiving mode comprises electrically connecting a component associated with the induced current to a battery of the first vehicle.

19. The method of claim 17, comprising converting a voltage associated with the induced current to a voltage associated with one or more vehicle specifications of the first vehicle.

20. The method of claim 17, comprising monitoring a charge level of a battery of the first vehicle.

* * * * *